United States Patent
Denney et al.

(10) Patent No.: US 8,701,712 B2
(45) Date of Patent: Apr. 22, 2014

(54) METHOD AND APPARATUS FOR MITIGATING UNDESIRED FLUID VIBRATION

(75) Inventors: Rusty Denney, Meeker, OK (US); Frederick L. Baker, Jr., Meeker, OK (US)

(73) Assignee: Coorstek, Inc., Golden, CO (US)

( * ) Notice: Subject to any disclaimer, the term of this patent is extended or adjusted under 35 U.S.C. 154(b) by 519 days.

(21) Appl. No.: 13/021,247

(22) Filed: Feb. 4, 2011

(65) Prior Publication Data

US 2011/0186166 A1 Aug. 4, 2011

Related U.S. Application Data

(60) Provisional application No. 61/301,473, filed on Feb. 4, 2010.

(51) Int. Cl.
*F16L 55/04* (2006.01)
*F15D 1/04* (2006.01)

(52) U.S. Cl.
USPC .............................................. 138/30; 138/39

(58) Field of Classification Search
USPC ................................ 138/30, 39; 137/207, 593
See application file for complete search history.

(56) References Cited

U.S. PATENT DOCUMENTS

| | | | |
|---|---|---|---|
| 2,416,025 A * | 2/1947 | Shaff ............................. | 138/26 |
| 2,563,257 A * | 8/1951 | Loukonen ....................... | 138/30 |
| 2,676,617 A * | 4/1954 | Felger ............................ | 138/26 |
| 2,898,935 A * | 8/1959 | Harris et al. .............. | 137/599.18 |
| 3,587,653 A * | 6/1971 | Jacobellis et al. ............. | 138/30 |
| 3,669,150 A * | 6/1972 | Everett ............................ | 138/26 |
| 5,097,862 A * | 3/1992 | Schneider ..................... | 137/207 |
| 5,265,645 A * | 11/1993 | Goodwin ................. | 137/512.15 |
| 5,303,843 A * | 4/1994 | Zink et al. ..................... | 220/563 |
| 6,123,525 A * | 9/2000 | Burns ........................... | 417/540 |
| 6,263,911 B1 * | 7/2001 | Brown et al. .............. | 137/519.5 |
| 6,357,482 B1 * | 3/2002 | Rogers ........................... | 138/30 |
| 6,543,485 B2 | 4/2003 | Henry et al. | |
| 2006/0065313 A1 * | 3/2006 | Saleri et al. .............. | 137/625.41 |

FOREIGN PATENT DOCUMENTS

EP 0300791 A1 1/1989

OTHER PUBLICATIONS

Lee, Choong H., "International Search Report", International Search Report for PCT/US2011/023794, 1-3.
Lee, Choong H., "Written Opinion of the International Searching Authority", Written Opinion for PCT/US2011/023794, 1-3.
Sato, Kazuo "JP09257140", Abstract of JP09257140, (Sep. 30, 1997),1.
Sato, Kazuo "JP08145236", Abstract for JP08145236, 1.

(Continued)

*Primary Examiner* — Paul R Durand
*Assistant Examiner* — Vishal Pancholi
(74) *Attorney, Agent, or Firm* — Fox Rothschild LLP

(57) ABSTRACT

A water hammer mitigation device includes an inlet, an outlet, an expansion housing, and a deflector. The inlet receives fluid from a source. The outlet passes the fluid to a destination. The expansion housing is disposed between the inlet and the outlet. The expansion housing defines an internal expansion chamber having an expansion volume sufficient to hold a plurality of volume units of the fluid. Each volume unit is defined by a fluid flow volume over a duration of time. The deflector is disposed within the expansion chamber. The deflector substantially redirects a backward energy pulse, which enters the expansion chamber through the outlet, away from the inlet.

21 Claims, 6 Drawing Sheets

(56) References Cited

OTHER PUBLICATIONS

Lee, Choong H., "International Search Report", International Search Report for PCT/US2011/023794, (Oct. 14, 2011),1-3.

Lee, Choong H., "Written Opinion of the International Searching Authority", Written Opinion for PCT/US2011/023794, (Oct. 14, 2011),1-3.

Sato, Kazuo "JP08145236", Abstract for JP08145236, (Jun. 7, 1996),1.

* cited by examiner

METHOD AND APPARATUS FOR MITIGATING UNDESIRED FLUID VIBRATION

CROSS-REFERENCE TO RELATED APPLICATIONS

This application claims the benefit of U.S. Provisional Application No. 61/301,473, filed on Feb. 4, 2010 which is incorporated by reference herein in its entirety.

BACKGROUND

In certain fluid flow applications, a propagating wave of energy is generated due to a sudden stoppage of fluid flow. This may be due to a sudden pump shut-down or a quick closing valve. This creates a backward surge or pulse of energy that can increase as it travels. This back surge carries with it a pressure spike and energy causing a vibration through the system sometimes known as "water hammer." Water hammer can damage the piping system and cause premature fatigue on pipes, component and joints. The further the wave travels, the more damaging the generated energy becomes.

One attempted solution involves a cylindrical-type dampener attached to the pipe in which the backward energy pulse is traveling. However, these solutions to suffer the drawback that in order to create a minimal solution or to mitigate the pulse, the system has to be pressurized entirely in order to change the direction of the pulse or surge into the dampener. The backward pressure spike or surge will find the path of least resistance, which doesn't usually involve a change in direction into the dampener until the system has been pressurized. But at that point, the surge has hit all the pipes, joints, valves, etc., and some damage will already have been done.

Some conventional solutions involve fixed choke devices positioned in-line in the pipe. However, these devices only mitigate a small percentage of the backward surge or pulse. Additionally, these devices often cause a pressure drop in the system which could adversely affect the makeup of the fluid flowing through the pipe. For example, in a pumping system for liquid propane (LP), if the water hammer device causes too big of a pressure drop in the forward direction, then the fluid could actually gas off.

SUMMARY

Embodiments of an apparatus are described. In one embodiment, the apparatus is a mitigation device to mitigate water hammer. An embodiment of the water hammer mitigation device includes an inlet, an outlet, an expansion housing, and a deflector. The inlet receives fluid from a source. The outlet passes the fluid to a destination. The expansion housing is disposed between the inlet and the outlet. The expansion housing defines an internal expansion chamber having an expansion volume sufficient to hold a plurality of volume units of the fluid. Each volume unit is defined by a fluid flow volume over a duration of time. The deflector is disposed within the expansion chamber. The deflector substantially redirects a backward energy pulse, which enters the expansion chamber through the outlet, away from the inlet. Other embodiments of the apparatus are also described. Corresponding methods and systems are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
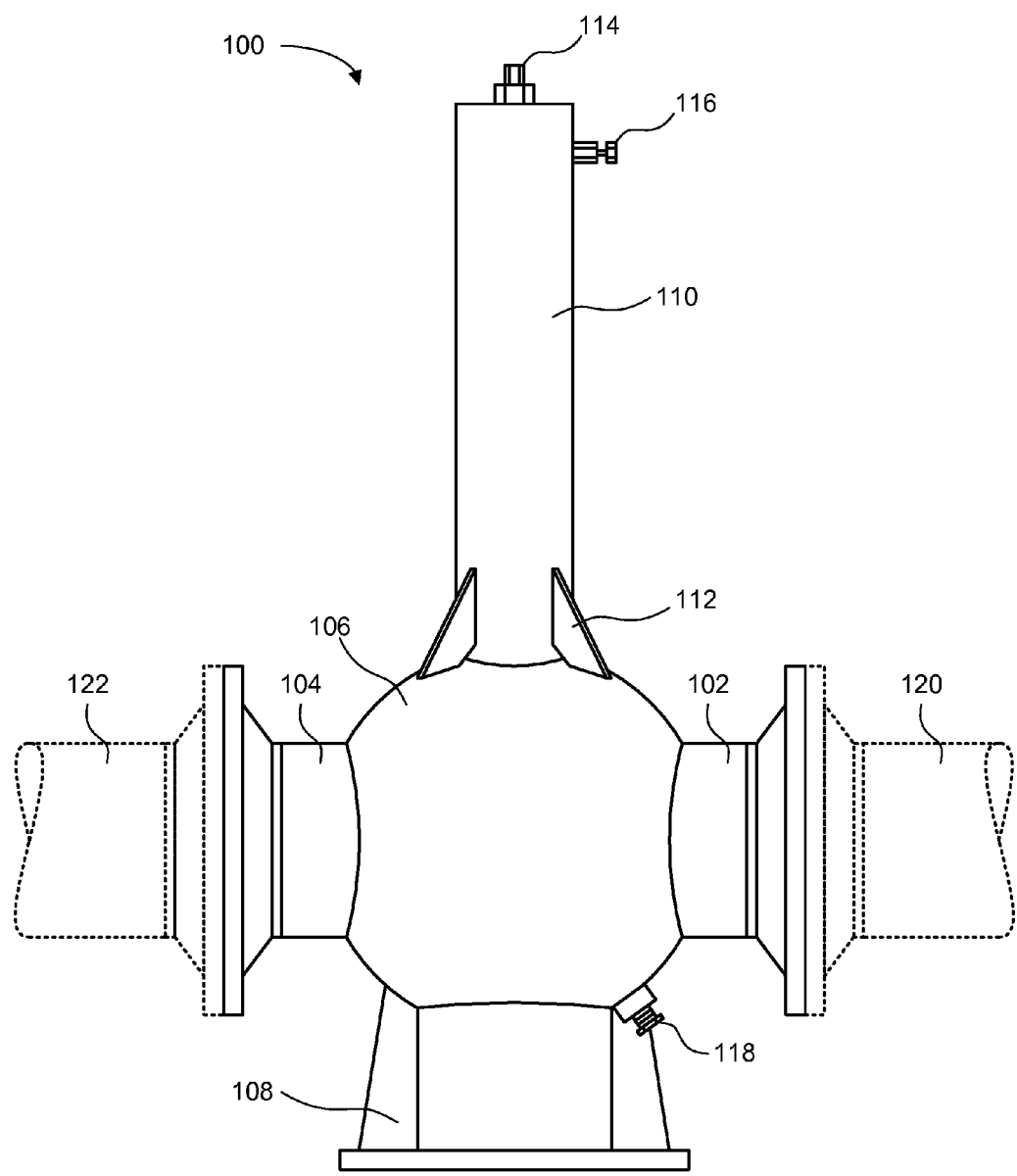
FIG. 1 depicts a schematic diagram of one embodiment of a mitigation device shown within the context of a piping system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Embodiments of the present invention have been developed in response to the present state of the art and, in particular, in response to the problems and needs in the art that have not yet been fully solved by currently available structures and methods. Accordingly, embodiments of the invention have been developed to provide structures and methods to overcome various shortcomings of the prior art. The features and advantages of various embodiments of the invention will become more fully apparent from the following description and appended claims, or may be learned by practice of the invention as set forth hereinafter.

While many embodiments are described herein, at least some of the described embodiments relate in general to mitigating undesired fluid pulsation due to sudden fluid stops in fluid flow. In a specific embodiment, a vessel is configured to contain and redirect a pulsation wave caused by backward fluid flow into a dampener, while substantially maintaining operational pressure in a forward fluid flow.

FIG. 1 depicts a schematic diagram of one embodiment of a mitigation device 100 shown within the context of a piping system. The illustrated mitigation device 100 includes components to provide certain functionality described herein. However, other embodiments of the mitigation device 100 may include fewer or more components to provide less or more functionality.

The illustrated mitigation device 100 includes an inlet 102 and an outlet 104. In a forward flow situation, the inlet 102 is where fluid enters the mitigation device 100 and the outlet 104 is where the fluid exits the mitigation device 100. The mitigation device 100 includes an expansion housing 106 disposed between the inlet 102 and the outlet 104. In some embodiments, the expansion housing 106 sits on a base 108 that may be attached to another structure (i.e., a floor or a wall). The mitigation device 100 also includes a dampener 110. The dampener 110 may be coupled to the expansion housing 106 by one or more structural braces 112. The illustrated dampener 110 includes typical adjustors 114 and 116. In some embodiments, at least one of the adjustors 114 and 116 is a bleeder valve to bleed gas from an internal bladder (see FIG. 6). In some embodiments, at least one of the adjustors 114 and 116 is a loading valve (or a charging valve) to load gas into the bladder. The mitigation device 100 also includes a drain plug 118.

In general, the mitigation device 100 is coupled within a pipeline to mitigate backflow energy such as water hammer. The mitigation device 100 is shown coupled between a source pipe 120 and a destination pipe 122. Water, or another fluid, typically flows from the source pipe 120 to the destination pipe 122.

In the illustrated embodiment, the expansion housing 106 is a hemisphere (or substantially hemispherical shape) with a certain diameter. Some examples diameters include, but are not limited to, up to about a 16 inch diameter, up to about a 34 inch diameter, and up to about a 51 inch diameter.

Various materials could be used for the expansion housing 106 and other parts of the mitigation device 100. For example, the expansion chamber could be made of SA516 metal. It will be appreciated that various materials could be used that can be welded, bonded, or otherwise attached to the source and destination pipes 120 and 122. For example, in one embodiment, the expansion housing 106 could be made out of a PVC high pressure fiber glass. Additionally, the expansion housing 106 may be made out of any number of constituent parts. For example, the expansion housing 106 may be made in two halves (or non-symmetrical pieces) and mechanically clamped together.

The minimum wall thickness and maximum allowable working pressure due to circumferential stress of the expansion housing 106 and other components of the mitigation device 100 may be determined by standard formulas. Similarly, standard data and formulas may be used for pipe flanges and diameters that can be used in conjunction with embodiments of the mitigation device 100. Also, joint efficiencies can be determined by standard radiography techniques.

Figure 2:
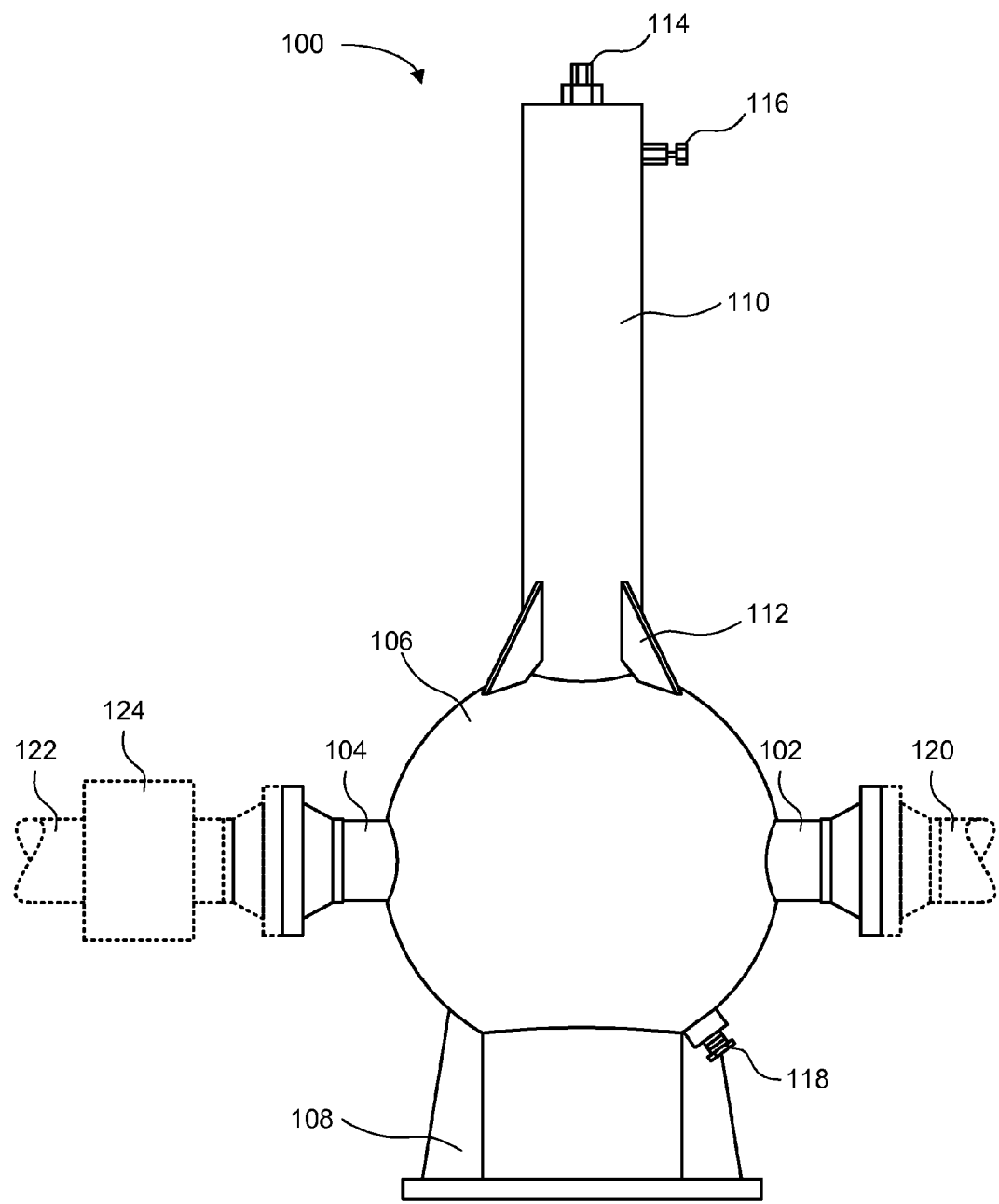
FIG. 2 depicts a schematic diagram of another embodiment of a mitigation device shown within a piping system.

FIG. 2 depicts a schematic diagram of another embodiment of a mitigation device 100 shown within a piping system. The illustrated mitigation device 100 of FIG. 2 is similar in many aspects to the mitigation device 100 of FIG. 1, except that the inlet 102 and outlet 104 are smaller in diameter, to match smaller source and destination pipes 120 and 122.

FIG. 2 also illustrates a backflow device 124, which is representative of any device which may cause a backflow energy pulse. Some examples of typical backflow devices 124 include pumps and valves. When a pump shuts down or a valve closes, this action may cause a backflow energy pulse which travels backwards towards the source pipe 120. As explained above, the backward surge or pulse of energy can cause harmful vibrations which can weaken the piping system or even cause the piping system to fail.

In general, the mitigation device 100 is coupled within the pipeline system relatively close to the backflow device 124 in order to mitigate the effects of the backflow energy pulse. In some embodiments, the mitigation device 100 is disposed a distance from the backflow device 124 in the pipeline system that is within approximately 30 times the cross-sectional diameter of the destination pipe 122. However, specific installation distances may be greater than this typical distance, for example, in situations where the pipeline layout does not accommodate a proper mounting location for the mitigation device 100. In other words, the relative distance between the backflow device 124 and the mitigation device 100 may vary depending on the specific installation conditions of each pipeline system.

Figure 3:
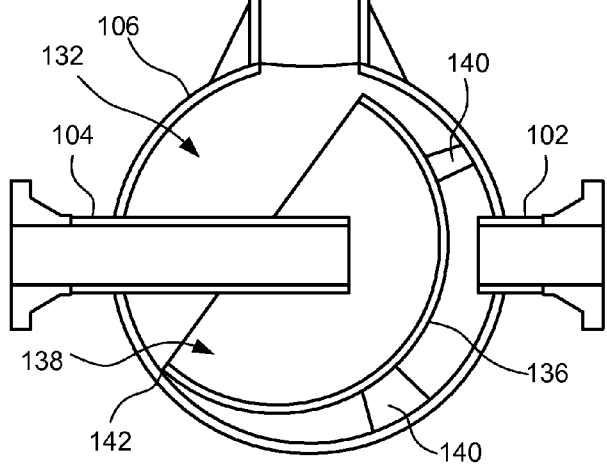
FIG. 3 depicts a side sectional view of the mitigation device of FIG. 2.

FIG. 3 depicts a side sectional view 130 of the mitigation device 100 of FIG. 2. For clarity and convenience some of the designations shown in FIGS. 1 and 2 are not repeated in FIG. 3 or the other figures that follow. The illustrated mitigation device 100 includes an expansion chamber 132 defined within the expansion housing 106. Typically, the cross-sectional dimensions of the expansion chamber 132 are larger than the cross-sectional dimensions of the inlet 102 and the outlet 104. This allows the expansion chamber 132 to hold a greater volume of fluid than the inlet 102 and the outlet 104. In some embodiments, the expansion chamber 132 is a certain percentage larger than the diameter of the pipe to which it is attached.

The dampener 110 attached to the expansion housing 106 also defines a dampener chamber 134. The dampener chamber 134 is in fluid communication with the expansion chamber 132. Thus, in some circumstances, fluid may flow between the expansion chamber 132 and the dampener chamber 134.

Figure 4:
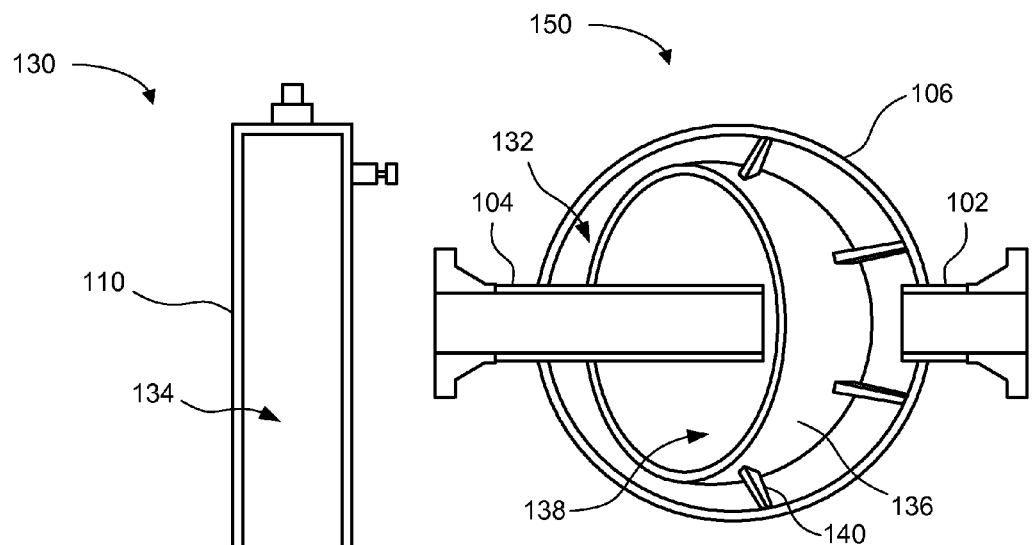
FIG. 4 depicts a top sectional view of the expansion chamber and the deflector of the mitigation device of FIG. 2.

The illustrated mitigation device 100 also includes at least one deflector 136 within the expansion chamber 132. In general, the deflector 136 redirects at least some of the backflow energy resulting from a backflow event into the dampener chamber 134. A specific type of deflector 136 is shown in FIGS. 3 and 4, but other embodiments may utilize other physical configurations of one or more deflectors 136 to result in deflection of a backward energy pulse (or a portion thereof) toward the dampener chamber 134.

In the illustrated embodiment, the deflector 136 has a convex surface which substantially faces the inlet 102 of the mitigation device 100. A corresponding a concave surface of the deflector substantially faces toward the outlet 104 of the mitigation device 100. The concave surface at least partially defines a concave volume 138 of the deflector 136. In some embodiments, the shapes and surfaces of the deflector 136 facilitate forward flow and redirected backflow within the mitigation device 100.

In some embodiments, the pipe of the outlet 104 extends into the concave volume 138 of the deflector 136. This configuration ensures that a backflow energy pulse is substantially controlled by the deflector 136 and contained within the mitigation device 100, without transferring back through the inlet 102 into the source pipe 120.

Also, in the illustrated embodiment, the deflector 136 is mounted within the expansion chamber 132 using one or more structural braces 140 or supports. A point or section 142 of the deflector 136 also may be welded or otherwise structurally affixed to the inner surface of the expansion housing 106. The amount and type of structural support that is provided for the deflector 136 may depend on the amount and type of backflow energy that is projected to occur within the mitigation device 100.

FIG. 4 depicts a top sectional view of the expansion chamber 132 and the deflector 136 of the mitigation device 100 of FIG. 2. In particular, the opening of the concave volume 138 of the deflector 136 is shown.

There may be a relationship in volume and/or area of the diameter of the source pipe 120 (or the destination pipe 122) to the volume and/or area of the expansion chamber 132. The volume of a pipe can be derived from the flow rate of the pipe by taking the volume of fluid that flows through a cross-section of the pipe during a unit of time (i.e., one second). In one embodiment, the volume of the expansion chamber 132 is between about 2 and about 6 times the volume of the source pipe 120 (or the destination pipe 122). In another embodiment, the volume of the expansion chamber 132 is between about 3.5 and about 4.5 times the pipe volume. In another embodiment, the value of the expansion chamber 132 is about 4 times the pipe volume. Other embodiments may implement other volumes for the expansion chamber 132.

As a specific example, if a flow rate for a particular pipe is 120 gallons per minutes, that value can be converted into its equivalent in cubic inches per second of fluid or material moving through the pipe. In this example, the flow rate is approximately 462 cubic inches per second. Multiplying this number by 4 equals 1848 cubic inches. Thus, using the formula for the volume of a sphere ($\frac{4}{3}\pi r^3$), the corresponding diameter of the expansion chamber 132 can be determined, which in this case would be about 15.22 inches. In one embodiment, the flow rate of a pipe is determined, and then a commercially available hemispherical expansion housing 106 having a volume that is approximately 2 to 6 times, or more specifically, 4 times the pipe volume (derived from the flow rate) is used. In another embodiment, the cubic inches of commercially available hemispheres are determined along with the flow rates of a number of lines in cubic inches per second and both are placed in a table for easy comparison to determine whether the ratio of expansion chamber volume and flow rate volume is within an acceptable range.

By implementing the expansion chamber 136 with a larger volume than the flow rate volume of the source pipe 120 leading into the mitigation device 100, the expansion chamber 136 has very little restriction on the operation of the overall piping system. In particular, the mitigation device 100 still allows the fluid to expand inside the expansion chamber 132. So there is relatively little or minimal disturbance in fluid in the forward flow because the expansion chamber 132 can hold multiple times (e.g., approximately 4 times) as much fluid as the source pipe 120 leading into the expansion chamber 120. The expansion chamber 132 is also sized to decrease the pressure drop due to the installation of the mitigation device 100. In other words, the expansion chamber 132 can be sized and shaped to avoid a drop in the operating pressure of the fluid as it passes through the mitigation device 100. If the mitigation device 100 were to introduce a pressure drop in the fluid, then it may be necessary to increase a pump size to counteract the pressure drop, so that the resulting pressure of the fluid delivered by the system is not changed. For example, if the mitigation device 100 were to cause a substantial pressure drop, then the addition of the mitigation device 100 to an existing system would likely require that a new, larger pump also be installed, which would increase the cost related to the installation of the mitigation device 100. By maintaining a relatively small pressure drop, within an acceptable range, the addition of the mitigation device 100 to an existing system would not require a larger pump or other equipment to be installed or the corresponding expense to be incurred.

Although some embodiments described herein use a spherical expansion chamber 132, the expansion chamber 132 need not be spherical in shape. In some embodiments, for example, the expansion chamber 132 is elongated. In other embodiments, the expansion chamber 132 is ellipsoidal. In other embodiments, the expansion chamber 132 is spheroidal. In other embodiments, the expansion chamber 132 can be another shape or a combination of complex shapes. The expansion chamber 132 can be one of many different shapes to accommodate various criteria such as space limitations, construction materials, or fluid properties.

In one embodiment, the average cross-sectional area of the expansion chamber 132 is configured to be up to about twice the area ($\pi r^2$) of the opening of the source pipe 120 feeding the expansion chamber 132. For example, if the inside diameter of the source pipe 120 feeding the expansion chamber 132 is 1.94 inches in diameter, then the area of the opening of the source pipe 120 is about 2.956 square inches. Thus, the inside area of the average cross-sectional area of the expansion chamber 132 may be up to about 5.91 square inches. In other embodiments, the average cross-sectional area of the expansion chamber 132 may be more than twice the area of the cross-sectional area of the source pipe 120 (or the destination pipe 122).

As mentioned above, the deflector 136 is configured to catch the backward energy surge or pulse inside the expansion chamber 132. Fluid flowing back into the expansion chamber 132 is allowed to expand and pressurize, to a certain point, and force the pressure upward into dampener chamber 134, allowing for the dampening of the pulse. In this way, the backward energy pulse is substantially captured and is not allowed to propagate further back upstream (i.e., into the source pipe 120) where it may cause damage or fatigue.

The deflector 136 may be affixed in any number of ways within the expansion housing 106. In one embodiment, the deflector 136 is welded to an interior surface of the expansion housing 106. The deflector 136 also may be chemically or electrochemically bonded to the interior surface of the expansion housing 106. In some implementations, where the expansion housing 106 is moldable, the deflector 136 may be formed or molded as an integral piece with the expansion housing 106.

The deflector 136 may be substantially planar or have a continuous or irregular curved surface. In other embodiments the deflector 136 may angular. In one embodiment, the deflector 136 is substantially hemispherical. The hemisphere is concave to the flow of fluid into the expansion chamber 132 from the outlet 104 (also referred to as a backflow inlet, in some cases) and convex to the flow of the fluid into the expansion chamber 132 from the inlet 102 (also referred to as a forward flow inlet).

In this configuration, fluid or energy entering the expansion chamber 132 through the outlet 104 (i.e., fluid or energy traveling back upstream due to a fluid flow stoppage or interruption downstream), is substantially redirected by the deflector 136 into the dampener chamber 134. However, the flow of fluid entering the expansion chamber 132 through the forward flow inlet, during regular operational fluid flow, is affected relatively little or minimally.

In the forward flow direction, the deflector 136 presents a convex or minimal surface so that fluid in that downstream direction simply flows around the deflector 136. It will be appreciated that this reduces strain on the pump, and thus reduces costs. In one example, fluid is at an operation pressure of 153 psi within the source pipe 120, and there is only about a 1.5 psi pressure drop going across the deflector 136 through the expansion chamber 132. This is about a 1% change in pressure due to the presence of the mitigation device 100. In other embodiments, the mitigation device 100 may influence a smaller or larger change in pressure, or possibly even an imperceptible change in pressure. In some embodiments, the mitigation device 100 may introduce a pressure drop of about 3-4%. For most conventional piping systems, a pressure drop of 3-4% (or up to about 4-5%) is acceptable because that amount of pressure drop would not require a change in pump size, or would only require a small change in pump size. This relatively small amount of pressure drop of 3-4% is much more acceptable than conventional inline mitigation devices which typically cause a pressure drop of 18-25% or more.

The deflector 136 may be positioned at an angle relative to the outlet 104 of the expansion chamber 132. In one embodiment, the angle of the deflector 136 relative to the outlet 104 is between about 15 and 75 degrees. In other embodiments, the angle of the deflector 136 relative to the outlet 104 is between about 30 and 60 degrees. In one embodiment, the angle of the deflector 136 relative to the outlet is about 45 degrees. Where the deflector 136 is a hemisphere, the circular opening of the deflector defines a plane that is angled about 45 degrees from the flow direction of the outlet 104.

The deflector 136 also may be positioned at an angle relative to the opening to the dampener chamber 134. In one embodiment, the angle of the deflector 136 relative to the opening to the dampener chamber 134 is between about 15 and 175 degrees. In other embodiments, the angle of the deflector 136 relative to the opening to the dampener chamber 134 is between about 30 and 120 degrees. In another embodiment, the angle of the deflector 136 relative to the opening to the dampener chamber 134 is between about 45 degrees and about 90 degrees. In other embodiments, the deflector 136 may be positioned within the expansion chamber 132 in any number of configurations to efficiently and/or optimally redirect backflow fluid or energy from the outlet 104 into the opening to the dampener chamber 134.

In some embodiments, the positioning of the deflector 136 within the expansion chamber 132 optimally creates the right amount of turbulence of fluid or energy coming back into the expansion chamber 132 through the outlet 104 by trying to maintain a rotation of the backflow fluid or energy in an upward motion, so most of the energy of the fluid is being forced upward. If there's too much turbulence, then the fluid and fluid energy is less controlled and attempts to find its own way and may not find its way up into the dampener chamber 134. If there is too little turbulence, then the fluid and fluid energy may just flow around the deflector 136.

In some embodiments, the mitigation device 100 also includes an outlet extender, which is a pipe or tube that extends from the outlet 104 to the interior of the concave volume 138 of the deflector 136. In this embodiment, the extender directs the backflow energy pulse directly into the deflector 136 for more efficient operation and alignment. In some embodiments, without the extender, the backflow energy pulse might enter the expansion chamber 132 at the edge where the backflow energy pulse would be allowed to disperse to a degree before encountering the deflector 136.

Embodiments of the deflector 136 are designed to have relatively little or minimal effect on the flow rate of the fluid. For example, if the fluid is flowing through a 2 inch pipe and enters the expansion chamber 132 with a forward flow rate of about 120 gallons per minute, then the position and the configuration of the deflector 136 within the chamber may be such that the fluid leaving the expansion chamber 132 is also flowing at substantially 120 gallons per minute. Thus, certain geometries and configurations of the expansion chamber 132 and the deflector 136 can influence or change the flow rate compared with a similar piping system which excludes the mitigation device 100. If a flow constant is defined to characterize the flow rate through the piping system, the inclusion or exclusion of the mitigation device 100 from the piping system can account for a difference in the flow rate value. In some embodiments, including the mitigation device 100 in the piping system only decreases the flow rate value by 5% or less. In another embodiment, the mitigation device 100 only decreases the flow rate value of the piping system by less than about 2%. Other embodiments may result in lower or higher flow rate changes when the mitigation device 100 is added to the piping system.

Figure 5:
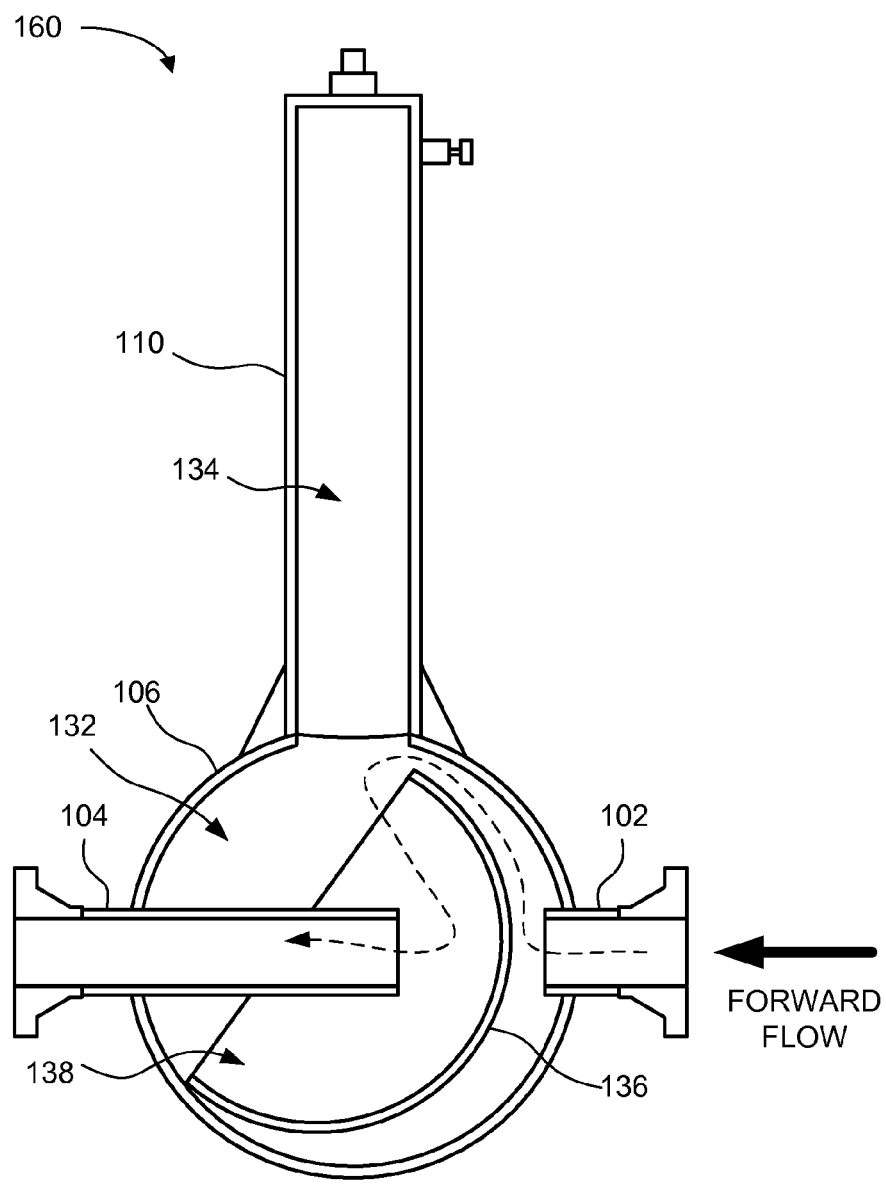
FIG. 5 depicts a process diagram of one embodiment of forward flow of a fluid through the mitigation device of FIG. 2.

FIG. 5 depicts a process diagram 160 of one embodiment of forward flow of a fluid through the mitigation device 100 of FIG. 2. The forward flow of the fluid through the mitigation device 100 is shown by the dashed arrow. As the fluid flows through the inlet 102 into the expansion chamber 132, the fluid flows around the deflector 136. Although only a single arrow is shown bypassing the top of the deflector 136, the fluid may flow around various edges of the deflector 136, depending on where and how the deflector 136 might be attached to the expansion housing 106. Once on the other side of the deflector 136, some of the fluid (or other fluid already within the expansion chamber 132) exits the expansion chamber 132 through the outlet 104.

Figure 6:
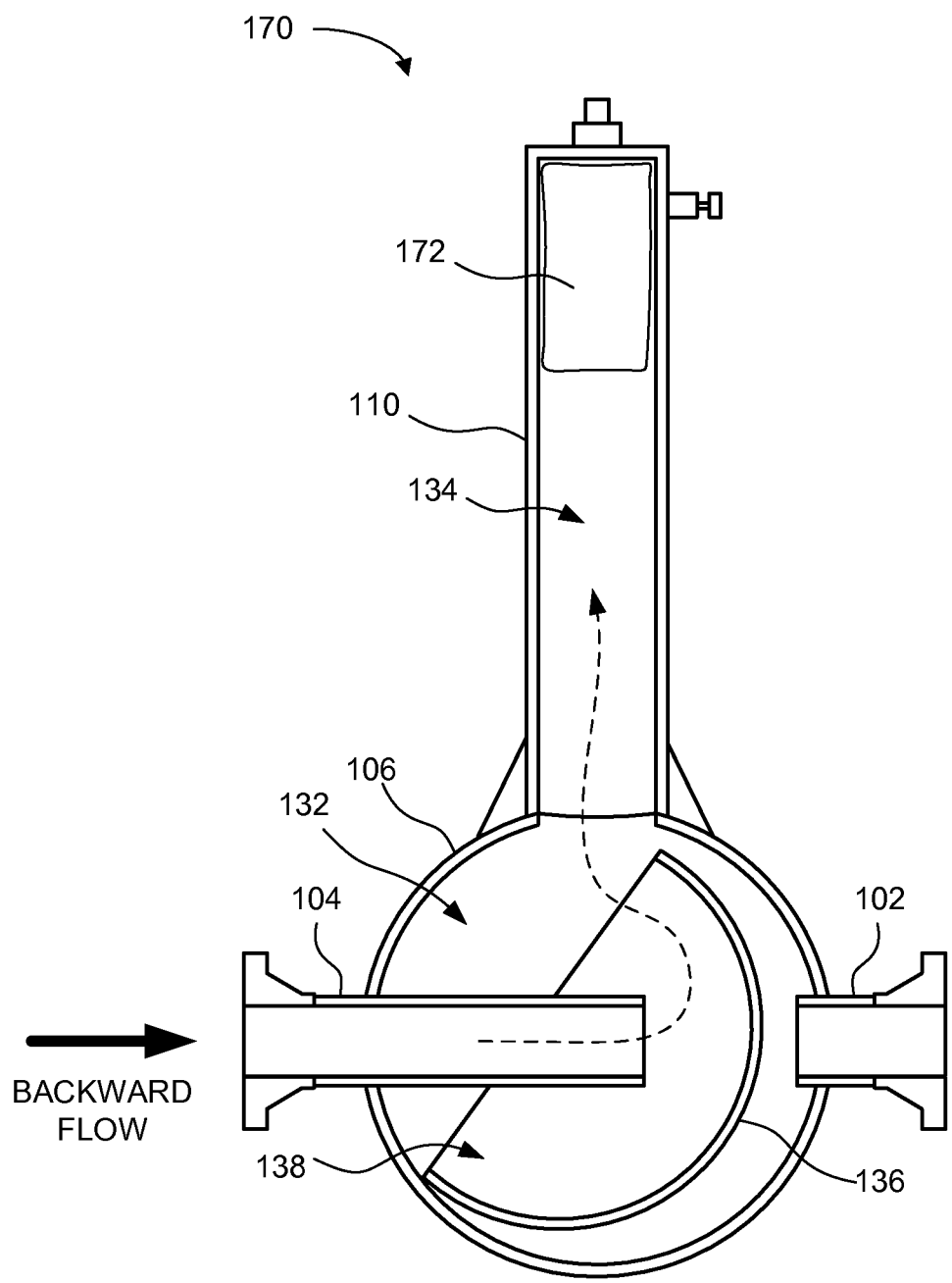
FIG. 6 depicts a process diagram of one embodiment of backward flow of a fluid through the mitigation device of FIG. 2.

FIG. 6 depicts a process diagram 170 of one embodiment of backward flow of a fluid through the mitigation device 100 of FIG. 2. For convenience, the description of backflow (or backward flow of fluid) may refer to the actual flow of fluid or to the propagation of energy through the fluid, or both. The backward flow of the fluid through the mitigation device 100 is shown by the dashed arrow. In response to a backflow event downstream of the mitigation device 100, the fluid flows back into the expansion chamber 132 through the outlet 104. Instead of flowing around the deflector 136 and upstream to the source pipe 120 (see FIG. 2) connected to the inlet 102, the deflector 136 redirects the fluid or energy pulse toward the dampener chamber 134. Although only a single arrow is shown deflecting up into the dampener chamber 134, the fluid or energy pulse may flow in any path toward the dampener chamber 134. Also, although some of the fluid or energy pulse may flow around various edges of the deflector 136, a significant portion of the backflow is deflected toward the dampener chamber 134.

The illustrated dampener 110 also includes a dampener material 172. The dampener material 172 may include compressible media. The deflector 136 within the expansion chamber 132 directs the pressure spike or backward energy surge into the dampener chamber 134, allowing for the compressible media to be compressed. Thus, the dampener 110 serves to dampen the backward pulse or pressure spike caused by the sudden flow stoppage. The compressible media absorbs at least some of the energy of the backward surge to mitigate the damage due to water hammer. In one embodiment, the compressible media is gas. The gas could be air, hydrogen, oxygen, helium, or a similar gas, or a combination of gasses. In one embodiment, the dampener material 172 is a gas-charged bladder where the gas substantially comprises nitrogen. In other embodiments, various gasses or combinations of gasses may be utilized based on their compressibility, stability, inertness, etc.

In another embodiment, the dampener material 172 is a gel or a solid. In another embodiment, the dampener material 172 may be a suspension of solids. In one embodiment, the compressible media is foam. The foam may have gas entrained inside of it so that it compresses at a certain rate. The dampener material 172 also may be a solid with gas trapped in it. Other compressible material could be used to absorb the energy of the pressure spike within the dampener 110. For example, in one embodiment, a mechanical device such as a spring stores the energy for later release in a way that does not cause damage to the system.

In one embodiment, the volume of the dampener chamber 134 is determined according to the following formula:

$$V = \frac{\text{Constant } A \times F \times P\text{max} \times ((\text{Constant } B \times L) - T)}{P\text{max} - P}$$

Where:

ConstantA is a value preferably between about 0.1-2.0 (e.g., about 0.924).

ConstantB is a value between about 0.001-0.01 (e.g., about 0.005).

F is the flow rate volume through the source or destination pipe.

Pmax is the existing spike pressure (i.e., the new maximum pressure of the fluid in the pipe due to the reversing pulse or water hammer).

P is the normal operating pressure of the fluid in the source pipe.

L is the distance from the source of flow stoppage back to the device.

T is the time in which it takes the flow to stop.

As one example, the following parameters may describe operating conditions of the piping system:

ConstantA=0.924 (cubic inches times minutes per gallons times seconds)
ConstantB=0.005 (seconds/ft)
F=100 (gallons per minute)
Pmax=30 (psi)
P=20 (psi)
L=200 (feet)
T=0.25 (seconds)

For these parameters, the volume of the dampener chamber is calculated to be about 207.9 cubic inches.

In some embodiments, the dampener 110 has a relatively low profile to accommodate placing the mitigation device 100 in a variety of places. In other embodiments, several different dampeners 110 are affixed to one expansion housing 106. The potential thicknesses for the dampener 110 and the potential thread shear for threaded caps on the dampener 110 may be determined by standard formulas.

Figure 7:
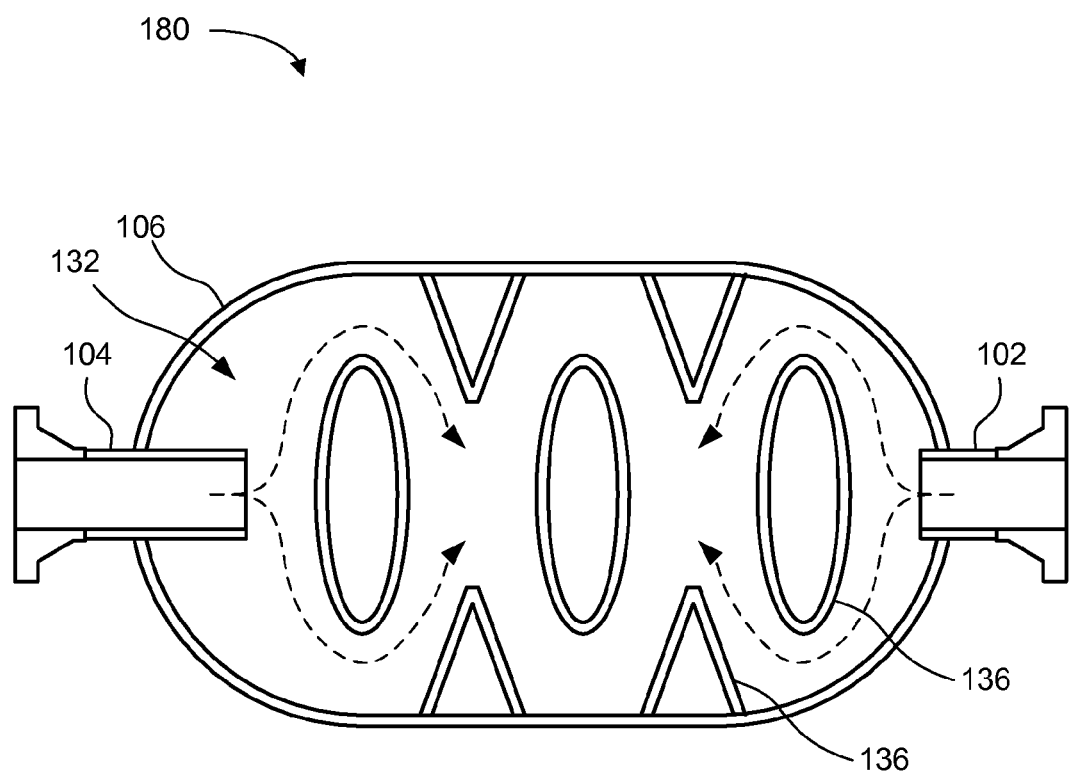
FIG. 7 depicts a side sectional view of another embodiment of a mitigation device with an elongated expansion housing.

FIG. 7 depicts a side sectional view 180 of another embodiment of a mitigation device 100 with an elongated expansion housing 106. The illustrated mitigation device 100 includes multiple deflectors 136 which are positioned at various locations within the expansion chamber 132. Some of the deflectors 132 (e.g., the angular deflectors of FIG. 7) are attached in series to the inner surfaces of the expansion housing 106. Others deflections 132 (e.g., the elliptical deflectors of FIG. 7) span across the width of the expansion housing 106 and attach to opposing inner surfaces of the expansion housing 106. The number and type of deflectors 136 that might be implemented in a particular embodiment is not limited to the illustrated types and quantities.

By implementing unique configurations of the mitigation device 100, embodiments of the expansion chamber 132 can isolate a backflow energy surge and/or prevent the backflow energy surge from flowing back upstream to cause damage due to water hammer. Rather, the expansion chamber 132 contains the backflow energy surge and, in some cases, redirects the backflow energy surge to the dampener chamber 134 where the surge is absorbed and reduced. Embodiments of the mitigation device 100 mitigate the pressure spike due to the back flow up to about 85%. Consequently, only about 15% of the pulse wave due to sudden flow stoppage propagates upstream past the mitigation device 100. Other embodiments provide more or less mitigation, depending on the design and performance specification for each piping system.

One embodiment of a method for making a mitigation device 100, as described herein, includes determining the size of the pipe in which the device is to be placed. The ratio of the volume of the expansion chamber 132 to the flow rate volume of the pipe is then determined. In one embodiment this ratio is between about 2 and 6. In another embodiment, the ratio is between about 3.5 and 4.5. In yet another embodiment, the ratio is about 4. The deflector 136 can then be fixed within the expansion chamber 132 at an appropriate angle. The inlet, outlet, outlet extender (optional), and dampener (optional) are the combined with the expansion chamber. Also, the wall thicknesses, pipe, flange, and thread dimensions and tolerances can be tested, and the operating pressures and pressure drops can be determined. Based on those results, adjustments may be made.

One advantage of certain embodiments of the mitigation device 100 is that the mitigation device 100 captures the backflow energy pulse or surge at a certain point and mitigates the affects of the pressure spike before it propagates upstream through the piping system. Additionally, in contrast to some conventional mitigation devices, embodiments of the mitigation device 100 described herein significantly reduce or minimize the pressure drop in the forward direction. Many fluids in pipes require a constant pressure within a certain range to keep the fluid from changing physical states. Another advantage of some embodiments of the mitigation device 100 is that the addition of the mitigation device 100 to the piping system has relatively little or minimal effect on the regular operating pressure of the piping system. Thus, embodiments of the mitigation device 100 reduce or minimize any physical change in the fluid that is being pumped. Additionally, embodiments of the mitigation device 100 do not require a substantial increase in the work required to pump the fluid through the device piping system. As a result, the cost or energy to move the same amount of product through the pipe is not increased.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A water hammer mitigation device for redirecting a backward energy pulse, the water hammer mitigation device comprising:
    an expansion housing including an inlet, an outlet, and an interior housing surface, wherein the interior housing surface of the expansion housing defines an internal expansion chamber;
    a deflector within the expansion chamber, the deflector fixedly mounted to a portion of the interior housing surface, the deflector including a fixed convex surface that substantially faces toward the inlet, the deflector including a fixed concave surface to define a concave volume wherein the concave volume is bounded between the outlet and the inlet by the fixed concave surface and opens in a direction substantially toward the outlet, wherein an end of the outlet extends into the concave volume of the deflector, and wherein the deflector is configured to substantially redirect the backward energy pulse, which enters the expansion chamber through the outlet, away from the inlet; and
    a dampener in fluid communication with the expansion chamber, wherein the fixed concave surface of the deflector is aligned to redirect the backward energy pulse at least partially toward the dampener to absorb at least a portion of the backward energy pulse.

2. The water hammer mitigation device of claim 1, wherein a proximate end of the dampener is coupled to the expansion chamber, and a distal end of the dampener is further away from the expansion chamber.

3. The water hammer mitigation device of claim 2, wherein the dampener comprises compressible media disposed at approximately the distal end of the dampener, wherein the compressible media is configured to compress in response to the backward energy pulse.

4. The water hammer mitigation device of claim 2, wherein the compressible media comprises a gas enclosed within a bladder, wherein the gas comprises nitrogen.

5. The water hammer mitigation device of claim 1, wherein the deflector is further configured to diffuse within the expansion chamber a forward fluid flow of a fluid from the inlet to the outlet.

6. The water hammer mitigation device of claim 1, wherein the deflector has a substantially quadric shape.

7. The water hammer mitigation device of claim 1, wherein the deflector is hemispherical.

8. The water hammer mitigation device of claim 1, wherein an expansion volume of the expansion chamber is sufficient to hold about 2 to 6 volume units of a fluid, wherein each volume unit is further defined as a fluid flow volume through the inlet during one second of time.

9. The water hammer mitigation device of claim 1, wherein an expansion volume of the expansion chamber is sufficient to hold about 3.5 to 4.5 volume units of a fluid, wherein each volume unit is further defined as a fluid flow volume through the inlet during one second of time.

10. The water hammer mitigation device of claim 1, wherein an expansion volume of the expansion chamber holds about 4.0 volume units of a fluid, wherein each volume unit is further defined as a fluid flow volume through the inlet during one second of time.

11. The water hammer mitigation device of claim 1, wherein an average cross-sectional area of the expansion chamber is at least twice a cross-sectional area of the inlet.

12. The water hammer mitigation device of claim 1, wherein the expansion chamber is substantially spherical.

13. The water hammer mitigation device of claim 1, wherein the expansion chamber is substantially elongated.

14. A method of installing a water hammer mitigation device, the method comprising:
    coupling an inlet of the mitigation device to a source pipe to receive fluid from a source; and
    coupling an outlet of the mitigation device to a destination pipe to pass the fluid to a destination;
    wherein the mitigation device comprises:
        an expansion housing disposed between the inlet and the outlet, wherein the expansion housing defines an internal expansion chamber having an expansion volume sufficient to hold a plurality of volume units of the fluid, wherein each volume unit is defined by a fluid flow volume over a duration of time; and
        a stationary deflector fixedly mounted within the expansion chamber, the stationary deflector having a concave surface and a convex surface, wherein at least a portion of the convex surface is spaced apart from both the inlet and an interior surface of the expansion housing, wherein the deflector is configured to substantially redirect a backward energy pulse, which enters the expansion chamber through the outlet, away from the inlet.

15. The method of claim 14, wherein coupling the outlet of the mitigation device to the destination pipe further comprises coupling the outlet within a predetermined distance to a backflow device which, upon stoppage of fluid flow, causes the backward energy pulse.

16. The method of claim 14, wherein the predetermined distance is within approximately thirty times a cross-sectional dimension of the destination pipe.

17. The water hammer mitigation device of claim 1, wherein at least a portion of the deflector is located such that the deflector intercepts a first axial alignment of the inlet and a second axial alignment of the outlet.

18. The water hammer mitigation device of claim 17, wherein the outlet is in coaxial alignment with the inlet.

19. A water hammer mitigation device for redirecting a backward energy pulse, the water hammer mitigation device positionable in a fluid transmission line configured to convey a fluid, the water hammer mitigation device comprising:

an expansion housing including an inlet, an outlet, and an interior housing surface;

a deflector fixedly mounted within the expansion housing, the deflector including a convex surface that substantially faces toward the inlet, wherein a first flow path zone within the expansion housing is bounded at least in part by a first portion of the interior housing surface of the expansion housing and at least a portion of the convex surface of the deflector, wherein a second flow path zone within the expansion housing is bounded at least in part by a second portion of the interior housing surface of the expansion housing and at least a portion of a concave surface of the deflector, and wherein the deflector is configured to substantially redirect the backward energy pulse, which enters the expansion housing through the outlet, away from the inlet; and a dampener in fluid communication with the expansion housing, wherein the concave surface of the deflector is aligned to redirect the backward energy pulse at least partially toward the dampener to absorb at least a portion of the backward energy pulse.

20. The water hammer mitigation device of claim 19, wherein an end of the outlet extends into a concave volume of the deflector.

21. The water hammer mitigation device of claim 19, wherein the inlet is in coaxial alignment with the outlet, and wherein at least a portion of the deflector intercepts the coaxial alignment of the inlet and the outlet.

\* \* \* \* \*